United States Patent
Miyairi

(10) Patent No.: US 8,709,349 B2
(45) Date of Patent: Apr. 29, 2014

(54) WALL FLOW TYPE EXHAUST GAS PURIFICATION FILTER

(75) Inventor: Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/597,681

(22) Filed: Aug. 29, 2012

(65) Prior Publication Data

US 2013/0058839 A1 Mar. 7, 2013

(30) Foreign Application Priority Data

Sep. 5, 2011 (JP) ................................. 2011-193174

(51) Int. Cl.
*B01D 50/00* (2006.01)

(52) U.S. Cl.
USPC ........................................... 422/177; 422/180

(58) Field of Classification Search
USPC ....................... 422/177, 180; 55/523; 428/116
See application file for complete search history.

(56) References Cited

U.S. PATENT DOCUMENTS

| | | | |
|---|---|---|---|
| 2005/0031514 A1 | 2/2005 | Patchett et al. | |
| 2007/0044444 A1* | 3/2007 | Oshimi | 55/523 |
| 2007/0137184 A1 | 6/2007 | Patchett et al. | |
| 2008/0132405 A1 | 6/2008 | Patchett et al. | |
| 2009/0255241 A1 | 10/2009 | Patchett et al. | |
| 2012/0034133 A1 | 2/2012 | Patchett et al. | |

FOREIGN PATENT DOCUMENTS

| | | |
|---|---|---|
| EP | 1 920 839 A1 | 5/2008 |
| EP | 1 946 840 A1 | 7/2008 |
| EP | 2 339 135 A1 | 6/2011 |
| JP | 2007-501353 A1 | 1/2007 |
| WO | 2005/016497 A1 | 2/2005 |

OTHER PUBLICATIONS

Extended European Search Report dated Jan. 18, 2013.

* cited by examiner

*Primary Examiner* — Tom Duong
(74) *Attorney, Agent, or Firm* — Burr & Brown, PLLC

(57) ABSTRACT

There is provided a wall flow type exhaust gas purification filter is provided with a honeycomb structure having porous ceramic partition walls 12 and plugging portions disposed in one side opening end portions of predetermined cells and the other side opening end portions of the other cells. In the exhaust gas purification filter, when an average pore size is obtained for each region of $\frac{1}{3}$ mm×$\frac{1}{3}$ mm in a range of 10 mm$^2$ in an arbitrary cross section perpendicular to a surface of the partition walls 12, a large pore region having an average pore size of 15 μm or more has an area of 0.1 mm$^2$ or more, and a small pore region having an average pore size of 8 μm or less has an area of 0.1 mm$^2$ or more.

14 Claims, 4 Drawing Sheets

WALL FLOW TYPE EXHAUST GAS PURIFICATION FILTER

BACKGROUND OF THE INVENTION

1. Field of the Invention

The present invention relates to a wall flow type exhaust gas purification filter. More specifically, the present invention relates to a wall flow type exhaust gas purification filter suitably used for purifying particulate matter, nitrogen oxide (NOx), carbon monoxide (CO), and hydrocarbon (HC) contained in exhaust gas from automobile engines.

Reduction of fuel consumption of automobiles has been demanded in recent years from the viewpoints of influence on the global environment and resource saving. Therefore, internal combustion engines having good heat efficiency such as a diesel engine and a direct-injection gasoline engine tend to be used as a power source for an automobile.

On the other hand, such internal combustion engines have a problem of soot generation upon combustion. From the viewpoint of the atmospheric environment, a measure not to release the aforementioned particulate matter such as soot to atmosphere is necessary.

As a measure not to release the aforementioned particulate matter to atmosphere, there has been proposed removal of particulate matter in exhaust gas by the use of an exhaust gas purification filter. As an exhaust gas purification filter, for example, there can be mentioned a wall flow type exhaust gas purification filter provided with a honeycomb structure having porous partition walls separating and forming a plurality of cells extending from one side end portion to the other side end portion and functioning as exhaust gas passages and plugging portions for alternately plugging one side end portion and the other side end portion of each of the cells of the honeycomb structure.

2. Description of Related Art

JP-A-2007-501353 discloses a means for filling a catalyst into pores of the partition walls of the wall flow type exhaust gas purification filter.

Purification with a wall flow type exhaust gas purification filter having a selective reduction (SCR) catalyst loaded thereon is effective for purifying NOx and particulate matter discharged from diesel engines. However, when a catalyst is loaded on a wall flow type exhaust gas purification filter where both the end portions are alternately plugged, gas permeability of the partition walls is degraded, which causes a problem of increase in pressure loss.

In addition, as a means for removing particulate matter discharged from a direct-injection gasoline engine, $NO_x$, CO, and HC at the same time, it is effective to load a ternary catalyst on a wall flow type exhaust gas purification filter. However, there arises a problem of increase in pressure loss due to degradation of the gas permeability of the partition walls by the loading of the catalyst. Further, in a conventional technique where a SCR catalyst is coated on the partition walls of a honeycomb structure, there arises a problem of increase in pressure loss due to reduction of the opening ratio by the thickness of the catalyst coat layer.

SUMMARY OF THE INVENTION

The present invention aims to provide a wall flow type exhaust gas purification filter where the pressure loss is hardly increased even after the catalyst is loaded thereon.

The present inventor found out that the aforementioned problems can be solved by specifying the size of the pores of the partition walls of the honeycomb structure. That is, according to the present invention, there is provided the following wall flow type exhaust gas purification filter.

[1] A wall flow type exhaust gas purification filter comprising: a honeycomb structure having porous ceramic partition walls separating and forming a plurality of cells extending from one end portion to the other end portion and functioning as exhaust gas passages, and plugging portions disposed in one side opening end portions of predetermined cells and the other side opening end portions of the other cells, wherein, when an average pore size is obtained for each region of ⅓ mm×⅓ mm in a range of 10 mm² in an arbitrary cross section parallel to a surface of the partition walls, a large pore region having an average pore size of 15 μm or more has an area of 0.1 mm² or more, and a small pore region having an average pore size of 8 μm or less has an area of 0.1 mm² or more.

[2] The wall flow type exhaust gas purification filter according to [1], wherein the large pore region has an average pore size of 20 μm or more and 200 μm or less and wherein the small pore region has an average pore size of 0.1 μm or more and 8 μm or less.

[3] The wall flow type exhaust gas purification filter according to [1] or [2], wherein the partition walls have a porosity of 50% or more and 70% or less.

[4] The wall flow type exhaust gas purification filter according to anyone of [1] to [3], wherein the partition walls have a thickness of 50.8 μm or more and 406.4 μm or less.

[5] The wall flow type exhaust gas purification filter according to any one of [1] to [4], wherein the honeycomb structure has a cell density of 100 cpsi or more and 700 cpsi or less.

[6] The wall flow type exhaust gas purification filter according to anyone of [1] to [5], wherein the honeycomb structure contains one of cordierite, aluminum titanate, SiC, Si-bonded SiC, and mullite.

[7] The wall flow type exhaust gas purification filter according to anyone of [1] to [6], wherein a SCR catalyst is coated on internal portions and surfaces of the partition walls.

[8] The wall flow type exhaust gas purification filter according to anyone of [1] to [6], wherein at least two kinds selected from noble metals of Pt, Rh, and Pd and a ternary catalyst containing at least one kind selected from alumina, ceria, and zirconia are coated on internal portions and surfaces of the partition walls.

In a wall flow type exhaust gas purification filter of the present invention, there are a large pore region having an average pore size of 15 μm or more and a small pore region having an average pore size of 8 μm or less in the partition walls of the honeycomb structure. In this case, when a catalyst is loaded, the catalyst is absorbed selectively in the small pore region, and the gas passages of the large pores remain. Therefore, a wall flow type exhaust gas purification filter of the present invention can suppress the rise of the pressure loss after the loading of the catalyst, and exhaust gas can be purified efficiently.

REFERENCE NUMERALS

Figure 1:
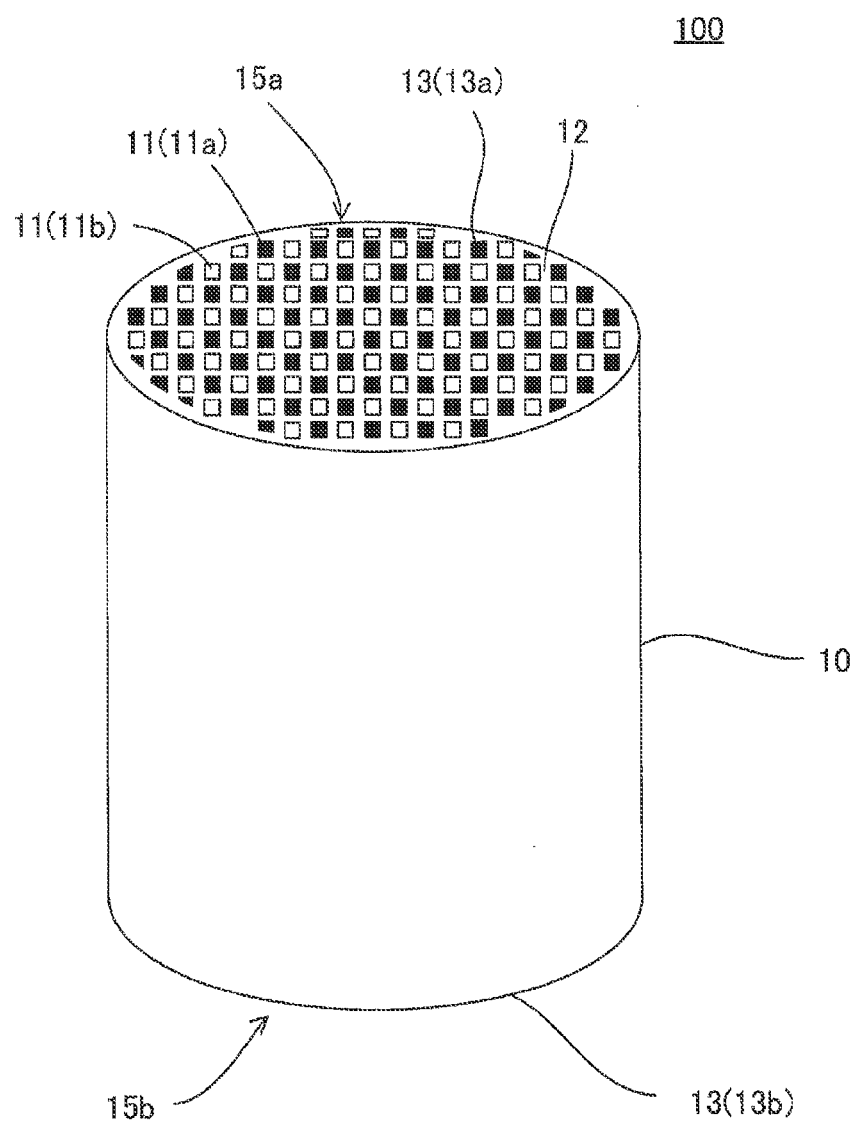
FIG. 1 is a perspective view showing one embodiment of a wall flow type exhaust gas purification filter of the present invention.

10: honeycomb structure, 11, 11a, 11b: cell, 12: partition wall, 12a: (exhaust gas) inlet side surface, 12b: (exhaust gas) outlet side surface, 13, 13a, 13b: plugging portion, 15, 15a, 15b: end portion, 17a: large pore, 17b: small pore, 100: wall flow type exhaust gas purification filter

DETAILED DESCRIPTION OF THE INVENTION

Hereinbelow, embodiments of the present invention will be described with referring to the drawings. The present invention is by no means limited to the following embodiments, and changes, modifications, and improvements may be made as long as they do not deviate from the scope of the present invention.

[1] Wall Flow Type Exhaust Gas Purification Filter:

An embodiment of a wall flow type exhaust gas purification filter (sometimes referred to simply as exhaust gas purification filter) of the present invention will be described with referring to a drawing. Here, FIG. 1 is a perspective view schematically showing an embodiment of an exhaust gas purification filter of the present invention. As shown in FIG. 1, the exhaust gas purification filter of 100 is provided with a honeycomb structure 10. The honeycomb structure 10 has porous ceramic partition walls 12 separating and forming a plurality of cells 11 extending from one side end portion 15a to the other side end portion 15b and functioning as exhaust gas passages. The exhaust gas purification filter 100 is provided with plugging portions 13 (13a, 13b) disposed in one side opening end portions 15a of predetermined cells 11a and the other side opening end portions 15b of the other cells 11b.

Figure 2:
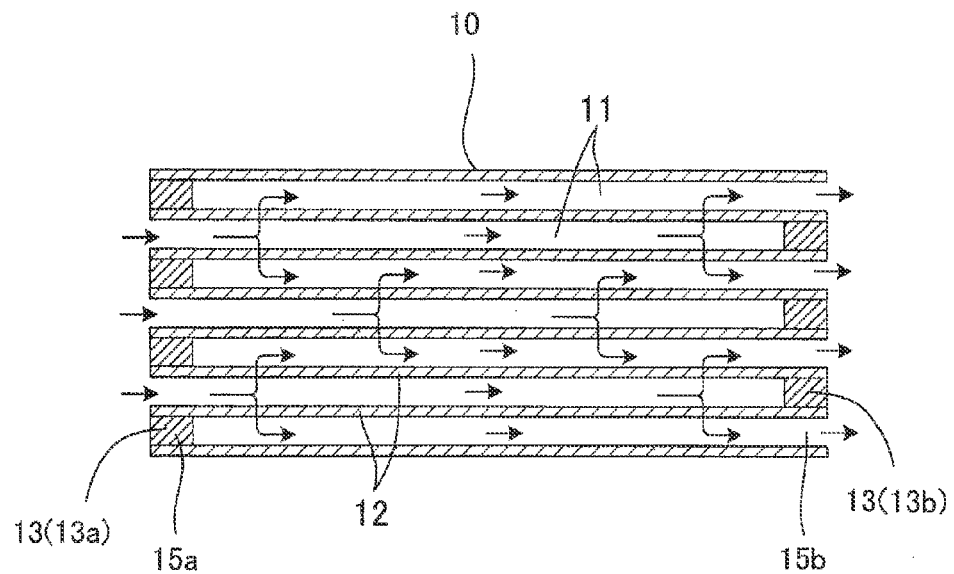
FIG. 2 is a cross section of a wall flow type exhaust gas purification filter of the present invention.

FIG. 2 shows across section of the wall flow type exhaust gas purification filter 100. In such a wall flow type exhaust gas purification filter 100, exhaust gas flows into the cells 11 from the cells 11 on one side end portion 15a side of the honeycomb structure 10, passes through the porous partition walls 12 functioning as a filtration layer, and flows out from the other side end portion 15b side. Upon passing through the partition walls 12, the exhaust gas is brought into contact with the catalyst layer loaded on the inner surfaces of the pores of the partition walls 12, and purification target components such as NOx, CO, and HC contained in exhaust gas are purified.

Figure 3:
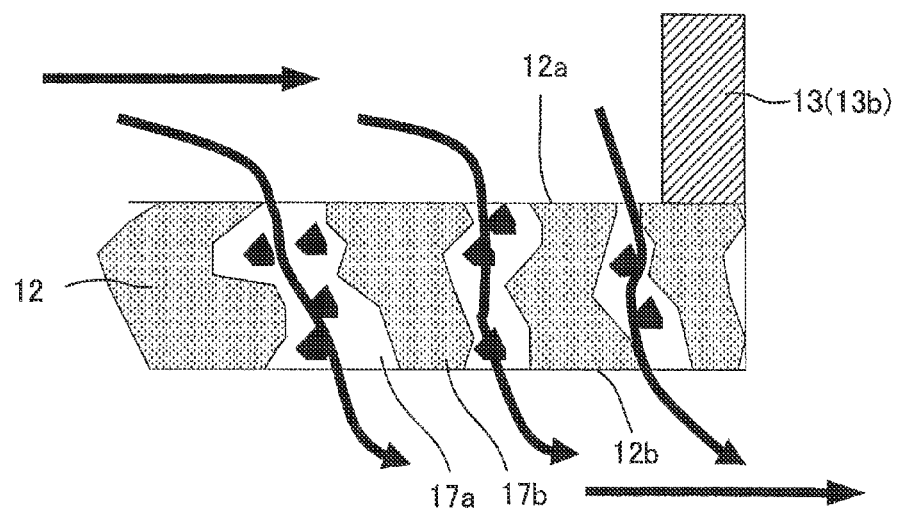
FIG. 3 is an enlarged schematic view of a partition wall.

FIG. 3 shows an enlarged schematic view of a partition wall 12. The exhaust gas purification filter 100 of the present embodiment has large pores 17a and small pores 17b in the partition walls 12 of the honeycomb structure 10. In FIG. 3, the large pore 17a is formed so as to pass through from the inlet side surface 12a to the outlet side surface 12b of the partition wall 12 in the thickness direction. In the exhaust gas purification filter 100, when an average pore size is obtained by each region of ⅓ mm×⅓ mm in a range of 10 mm² in an arbitrary cross section parallel to a surface (inlet side surface 12a or outlet side surface 12b) of the partition walls 12 (arbitrary cross section perpendicular to the thickness direction of the partition wall 12), a large pore region having an average pore size of 15 µm or more has an area of 0.1 mm² or more, and a small pore region having an average pore size of 8 µm or less has an area of 0.1 mm² or more. That is, the large pore region and the small pore region in the present invention are determined by obtaining an average pore size by each region of ⅓ mm×⅓ mm. Therefore, the large pore 17a and the small pore 17b are distinguished from the large pore region and the small pore region, respectively.

A method of obtaining an average pore size in the present invention will be described. In the first place, an SEM image is taken in an arbitrary cross section parallel to a surface of the partition walls 12 (arbitrary cross section perpendicular to the thickness direction of the partition wall 12) (see FIG. 4). A vision of 1 mm×1 mm of the SEM image is equally divided into nine regions, and the average pore size is obtained by each of the 9 regions (region of ⅓ mm×⅓ mm) (see FIG. 5). Specifically, the average value of 50 line segments over the pore space portions in each of the 9 regions of the SEM image, and the average value is employed as the average pore size. The region having an average pore size of 15 µm or more is defined as a large pore region, and the region having an average pore size of 8 µm or less is defined as a small pore region. The number and the total area of each of the large pore regions and the small pore regions are obtained regarding the region of 1 mm×1 mm vision equally divided into nine.

As a method for allowing the small pores and the large pores to be present together, for example, there is a method where pore formers having different sizes are mixed with the material for the honeycomb structure 10, a honeycomb formed body is obtained by extrusion or the like, and it is dried and fired.

Thus, since the exhaust gas purification filter 100 of the present embodiment necessarily has 0.1 mm² or more of each of the large pore region and the small pore region in a range of 10 mm² of an arbitrary cross section parallel to a surface of the partition wall 12, a catalyst is absorbed selectively in the small pore region, and the gas passages of the large pores 17a remain. Therefore, increase in pressure loss after the loading of the catalyst can be suppressed, and the exhaust gas can be purified efficiently.

The average pore size of the large pore region formed in the partition walls 12 (average of the average pore sizes in the regions having an average pore size of 15 µm or more and being judged as large pore regions) is preferably 15 µm or more and 200 µm or less, more preferably 20 µm or more and 100 µm or less, furthermore preferably 25 µm or more and 50 µM or less. The average pore size of the small pore region (average of the average pore sizes in the regions having an average pore size of 8 µm or less and being judged as small pore regions) is preferably 0.1 µm or more and 8 µm or less, more preferably 1 µm or more and 8 µm or less, furthermore preferably 2 µm or more and 6 µm or less.

In addition, in the exhaust gas purification filter 100 of the present embodiment, the porosity of the partition walls 12 is preferably 50% or more and 70% or less, more preferably 50% or more and 65% or less, furthermore preferably 55% or more and 65% or less. When the porosity of the partition walls 12 is 50% or more, increase in pressure loss can be suppressed. When the porosity of the partition walls 12 is 70% or less, strength of the exhaust gas purification filter 100 can be secured. Furthermore, the porosity in this range enables to load a catalyst sufficiently on the partition walls 12. Incidentally, the porosity means a porosity measured by mercury porosimetry.

In addition, the exhaust gas purification filter 100 of the present embodiment, the thickness of the partition walls 12 is preferably 50.8 µm or more and 406.4 µm or less, more preferably 101.6 µm or more and 406.4 µm or less, furthermore preferably 101.6 or more and 304.8 µm or less. When the thickness of the partition walls 12 is 50.8 µm or more, strength of the exhaust gas purification filter 100 can be secured. On the other hand, when the thickness of the partition walls 12 is 406.4 μm or less, increase in pressure loss can be suppressed.

In the exhaust gas purification filter 100 of the present embodiment, the cell density of the honeycomb structure 10 is preferably 100 cpsi or more and 700 cpsi or less, more preferably 150 cpsi or more and 400 cpsi or less, furthermore preferably 150 cpsi or more and 350 cpsi or less. Such constitution enables to suppress increase in pressure loss with maintaining the strength of the exhaust gas purification filter 100.

As shown in FIG. 1, a honeycomb structure 10 used for the exhaust gas purification filter 100 of the present embodiment has porous ceramic partition walls 12 separating and forming a plurality of cells 11 extending from one side end portion 15a to the other side end portion 15b and functioning as exhaust gas passages.

There is no particular limitation on the entire shape of the honeycomb structure 10, and examples of the shape include an elliptic column, a quadrangular prism, and a triangular prism besides a circular column as shown in FIG. 1.

Examples of the shape of the cells 11 formed in the honeycomb structure 10 (cell shape in a cross section perpendicular to the cell 11 extension direction) include a hexagon, an octagon, and a triangle besides a quadrangle as shown in FIG. 1. However, the shape of the cells 11 formed in the honeycomb structure 10 is not limited to these shapes, and known cell shapes can be included widely.

In the honeycomb structure 10, different cell shapes may be combined. By employing an octagon for one of the adjacent cells 11 with employing a quadrangle for the other cell 11, one cell 11 (i.e., octagonal cell) can be made large in comparison with the other cell 11 (i.e., quadrangular cell).

The material for the honeycomb structure 10 is ceramic. From the viewpoint of strength, heat resistance, corrosion resistance, and the like, it is preferable that the material contains one of cordierite, aluminum titanate, SiC, Si-bonded SiC, and mullite. Among these materials, cordierite is particularly preferable.

The plugging portions 13 are disposed in one side opening end portions 15a of predetermined cells 11a and the other side opening end portions 15b of the other cells 11b of the honeycomb structure 10 in order to seal one of the opening end portions 15 (15a, 15b) of each of the cells 11 (11a, 11b). The plugging portions 13 may be constituted in the same manner as the plugging portions 13 used for a conventional exhaust gas purification filter 100. The plugging portions 13 can be formed by the use of the same ceramic material as that for the partition walls 12 of the honeycomb structure 10.

In the exhaust gas purification filter 100 of the present embodiment, it is preferable that a checkerwise pattern is formed by the plugging portions 13 and openings of the unplugged cells 11 (see FIG. 1) on one side end face of the honeycomb structure 10.

In the exhaust gas purification filter 100 of the present embodiment, it is preferable that the length of the plugging portions 13 plugging open end portions of cells 11 in the cell 11 extension direction is 1 mm or more and 7 mm or less. When the length in the cell 11 extension direction is below 1 mm, the plugging portions 13 may easily be detached from the honeycomb structure 13. When the length of the plugging portions 13 in the cell 11 extension direction is above 7 mm, the length of the plugged portions of the cells 11 becomes too long, and the effective area (in other words, substantial length in the cell 11 extension direction of the partition walls 12) of the partition walls 12 for purifying exhaust gas is reduced, which may lower purification performance of the filter.

In the exhaust gas purification filter 100 of the present embodiment, a catalyst is loaded on the surfaces of the partition walls 12 and the internal portions of the pores formed in the partition walls 12 of the honeycomb structure 10. By loading a catalyst in such a manner, particulate matter deposited on the surfaces of the partition walls can easily be combusted and removed by catalysis in addition to purification of NOx, CO, and unburnt hydrocarbon.

As the catalyst, a SCR catalyst (zeolite, titania, vanadium) can be mentioned. Alternatively, at least two kinds of noble metals of Pt, Rh, and Pd and a ternary catalyst containing at least one kind selected from alumina, ceria, and zirconia are coated on the surfaces of the partition walls 12 and internal portions of the pores formed in the partition walls 12 of the honeycomb structure 10.

Though there is no particular limitation on the catalyst load amount, the load amount per unit volume (g/L) of the honeycomb structure 10 is preferably 220 g/L or less. In the exhaust gas purification filter 100 of the present embodiment, excessive loading of a catalyst may increase pressure loss. In the case that a catalyst is loaded on the partition walls 12 of the honeycomb structure 10, each of the aforementioned values such as the average pore size of the partition walls 12 means a value measured in a partition wall 12 of the honeycomb structure 10 before a catalyst is loaded.

[2] Method for Producing Wall Flow Type Exhaust Gas Purification Filter:

Hereinbelow, a method for producing an exhaust gas purification filter 100 of the present invention will be described. As a method for producing a honeycomb structure 10 of the present invention, in the first place, there is produced a honeycomb structure 10 having porous ceramic partition walls 12 separating and forming a plurality of cells 11 extending from one side end portion 15a to the other side end portion 15b and functioning as exhaust gas passages.

In addition, the average pore size and pore size distribution of the partition walls 12 of the honeycomb structure 10 to be obtained can be realized by adjusting the particle size and compounding prescription of the ceramic raw material used for preparing a kneaded material for forming. Hereinbelow, regarding a method for preparing the kneaded material for forming, each of the case of preparing a kneaded material using a cordierite-forming raw material and the case of preparing a kneaded material using a silicon carbide raw material will specifically be described.

In the case of preparing a kneaded material for forming by the use of a cordierite-forming raw material, a dispersion medium such as water and a pore former as desired are added to the cordierite raw material, and an organic binder and a dispersant are further added to them to obtain a mixture. The mixture is kneaded to obtain a kneaded material having plasticity. The cordierite-forming raw material means a raw material which becomes cordierite by firing. The cordierite-forming raw material is a ceramic raw material where "predetermined raw materials" are mixed so as to have a chemical composition having silica ($SiO_2$) of 42 to 56 mass %, alumina ($Al_2O_3$) of 30 to 45 mass %, and magnesia (MgO) of 12 to 16 mass %. Examples of the "predetermined raw materials" include talc, kaolin, alumina source raw material, and silica. The alumina source raw material means aluminum oxides, aluminum hydroxide, boehmite, or the like. These form oxides by firing and form a part of cordierite. There is no particular limitation on the method for forming the kneaded material by kneading a forming raw material such as a cordierite-forming raw material, and, for example, a method using a kneader, a vacuum kneader, or the like may be employed.

The average pore size and the pore size distribution of the partition walls 12 of the honeycomb structure 10 to be obtained can be controlled by the particle diameter and the compounding ratio of talc and silica to be used as a raw material. Further, in order to form both the large pore region and the small pore region, it is preferable to mix pore formers having different sizes. As the pore former for forming the large pore region, there can be used carbon, resin particles, starch, and the like having an average particle diameter of 15 µm or more. As the pore former for forming the small pore region, there can be used particles having an average particle diameter of 10 µm or less obtained by sieving carbon or starch having an average particle diameter of 20 µm or less or by separating by the difference in rate of sedimentation in liquid. However, the pore former is not limited to the particles.

In the case of preparing a kneaded material for forming by the use of a silicon carbide raw material, a dispersion medium such as water and a pore former as desired are added to the silicon carbide raw material, and an organic binder and a dispersant are further added to them to obtain a mixture, which is then kneaded to obtain a kneaded material having plasticity.

The average pore size and the pore size distribution of the partition walls 12 of the honeycomb structure 10 to be obtained can be controlled by the particle diameter distribution of the silicon carbide raw material. Further, in order to form both the large pore region and the small pore region, it is preferable to mix pore formers having different sizes. Incidentally, the pore former is the same as in the case of using a cordierite-forming raw material.

Next, the kneaded material obtained is formed into a predetermined shape to obtain a honeycomb formed body. There is no particular limitation on the method for forming a honeycomb formed body by forming a kneaded material for forming, and a conventionally known forming method such as extrusion or injection can be employed. As a suitable example, there is a method of forming a honeycomb formed body by extrusion using a die having desired cell shape, partition wall 12 thickness, and cell density. As the material for the die, a superhard alloy which hardly abrades away is preferable.

Next, open end portions of cells 11 of the honeycomb formed body are plugged with slurry for forming plugging portions 13 to form plugging portions 13. Then, the honeycomb formed body having the plugging portions 13 is fired (main firing) to obtain a honeycomb structure 10. Calcination may be performed before firing the honeycomb formed body.

The aforementioned calcination is performed for degreasing. The calcination is performed, for example, at 550° C. for about 3 hours in an oxygen atmosphere. However, without limiting to this, the calcination is preferably performed according to the organic matter (organic binder, dispersant, pore former, and the like) in the honeycomb formed body. Generally, combustion temperature of an organic binder is about 100 to 300° C., and combustion temperature of a pore former is about 200 to 800° C. Therefore, the calcination temperature may be about 200 to 1000° C. Though there is no particular limitation on the calcination time, it is generally about 3 to 100 hours.

The "firing (main firing)" means an operation for securing strength by sintering the forming raw material in the calcined body. Since the firing conditions (temperature and time) depend on the kind of the forming raw material, suitable conditions may be selected according to the kind. For example, though the firing temperature is generally about 1400 to 1500° C., the temperature is not limited to this. Though the calcination and the main firing may be performed in separated steps, the main firing may be performed consecutively by raising temperature after calcination.

As described above, an exhaust gas purification filter 100 of the present invention can be produced. In the aforementioned production method there is described an example where, after forming plugging portions 13 for plugging opening end portions of cells 11, the calcination and the main firing are performed to produce an exhaust gas purification filter 100. However, the plugging portions 13 may be formed separately after the honeycomb formed body is fired. As a method for forming plugging portions 13, there is a method where a mask is disposed on the opening portions on one side of predetermined cells 11 to fill the plugging slurry into the opening portions of the other cells 11. Such a method for forming plugging portions 13 may be performed according to a method for forming plugging portions 13 in a known honeycomb structure 10.

As a raw material for the plugging portions 13, the same raw material as that for the aforementioned honeycomb structure 10 is preferable because the expansion coefficient upon firing can be made the same between the honeycomb structure 10 and the plugging portions 13, which leads to enhancement of durability.

In the aforementioned production method, there is described an example of the case that the honeycomb structure 10 is formed by being unitarily extruded (i.e., unitary forming). However, it is also possible to produce a honeycomb structure 10 constituted of a honeycomb segment bonded body obtained by bonding a plurality of honeycomb segments together.

A catalyst is loaded on the internal surfaces of the pores, surfaces of the partition walls, and surfaces inside the communicating holes 12 of the honeycomb structure 10 obtained as described above to produce a honeycomb catalyst body. There is no particular limitation on the method for loading a catalyst, and a catalyst can be loaded in accordance with a method employed in a conventionally known method for producing a honeycomb catalyst body. For example, catalyst slurry containing a catalyst is prepared. Then, the catalyst slurry prepared is allowed to flow into cells by dipping or suction. It is preferable that the catalyst slurry is applied over the entire surfaces of the partition walls in the cells. After the catalyst slurry is allowed to flow into the cells, surplus slurry is blown away by compressed air. Then, the catalyst slurry is dried and baked. The baking may be performed at 450 to 700° C. for 0.5 to 6 hours. By the aforementioned steps, an exhaust gas purification filter 100 of the present invention can be produced.

EXAMPLE

Hereinbelow, the present invention will be described in more detail on the basis of Examples. However, the present invention is by no means limited to these Examples.

Examples 1 to 10

Comparative Examples 1 to 3

Production of Exhaust Gas Purification Filter

As the cordierite-forming raw material, alumina, aluminum hydroxide, kaolin, talc, and silica were used. To 100 parts by mass of the cordierite-forming raw material were added 35 parts by mass of a dispersion medium, 6 parts by mass of an organic binder, and 0.5 parts by mass of a dispersant, and they were mixed and kneaded to prepare a kneaded material for forming. Water was used as the dispersion medium, hydroxypropylmethyl cellulose was used as the organic binder, and ethylene glycol was used as a dispersant. The compounding ratio was made the same among all Examples. In Example 1, a pore former having an average particle diameter of 3 μm and another pore former having an average particle diameter of 15 μm were mixed. With regard to Examples 2 to 10 and Comparative Examples 1 to 3, the pore formers shown in Table 1 were used.

The kneaded material prepared above was subjected to extrusion to obtain a honeycomb formed body. The honeycomb formed body was dried by the use of a microwave dryer and completely dried by the use of a hot air dryer. Then, both the end faces of the honeycomb formed body dried above were cut off to obtain a honeycomb dried body having a predetermined length. Next, after plugging portions 13 were formed so that adjacent cells 11 were alternately plugged in both the end faces of the honeycomb dried body, firing was performed at 1410 to 1440° C. for 5 hours to obtain an exhaust gas purification filter 100.

The entire shape of the exhaust gas purification filter 100 (honeycomb structure 10) obtained above was a circular column (diameter of an end face was 118 mm, and length in the cell 11 extension direction was 127 mm). The length of the plugging portions 13 in the cell 11 extension direction was 4 mm.

[Porosity (%)]

The porosity (%) was measured by a mercury porosimeter (mercury porosimetry). As the mercury porosimeter, there was used Auto Pore III, type 9405, produced by Micromeritics Instrument Corporation.

The pore formers used for producing an exhaust gas purification filter 100, partition wall 12 thickness, cell density, and porosity of the exhaust gas purification filter 100 produced above are shown in Table 1.

TABLE 1

| | Pore former Average particle diameter (μm) | | Partition wall thickness (μm) | Cell density (cpsi) | Porosity (%) |
|---|---|---|---|---|---|
| | Small | Large | | | |
| Example 1 | 3 | 15 | 139.7 | 300 | 50 |
| Example 2 | 3 | 20 | 139.7 | 300 | 58 |
| Example 3 | 3 | 40 | 139.7 | 300 | 58 |
| Example 4 | 6 | 120 | 139.7 | 300 | 58 |
| Example 5 | 6 | 180 | 139.7 | 300 | 58 |
| Example 6 | None | 40 | 165.1 | 400 | 58 |
| Example 7 | 1 | 40 | 165.1 | 400 | 58 |
| Example 8 | 3 | 40 | 165.1 | 400 | 58 |
| Example 9 | 5 | 40 | 165.1 | 400 | 60 |
| Example 10 | 6 | 40 | 165.1 | 400 | 70 |
| Comp. Ex. 1 | 6 | 120 | 139.7 | 300 | 58 |
| Comp. Ex. 2 | 6 | 120 | 139.7 | 300 | 58 |
| Comp. Ex. 3 | 6 | 120 | 139.7 | 300 | 58 |

[Average Pore Size]

Figure 4:
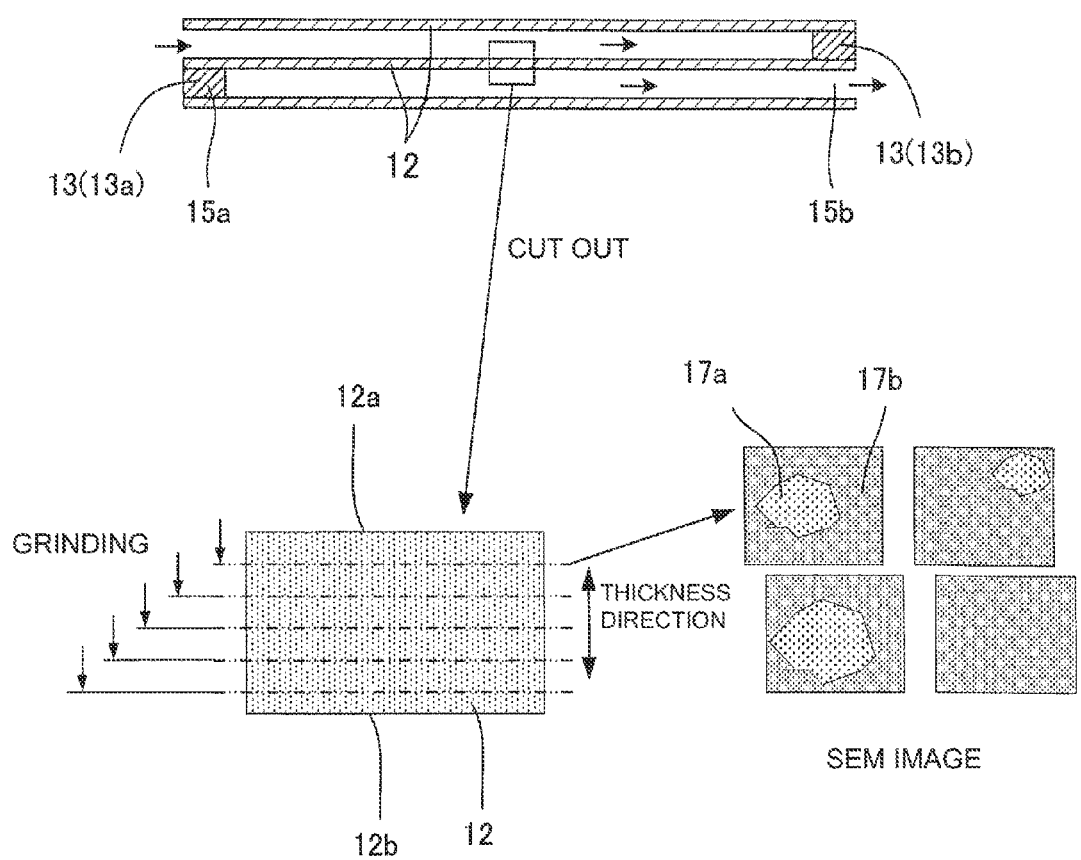
FIG. 4 is an explanatory view for explaining a method for measuring an average pore size.
Figure 5:
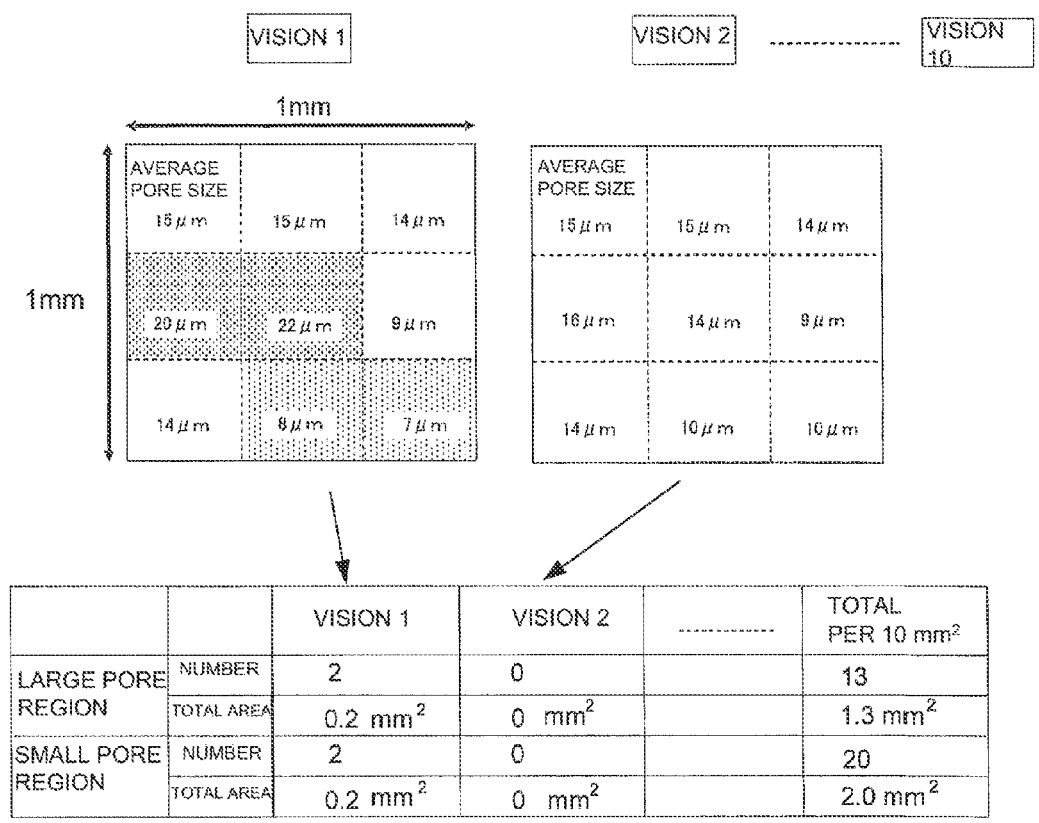
FIG. 5 is an explanatory view for explaining a method for treating an SEM image.

A method for measuring average pore size will be described with referring to FIGS. 4 and 5. As shown in FIG. 4, a partition wall 12 was cut out, and filled with resin. An arbitrary cross section parallel to a surface of the partition wall 12 was exposed by grinding to take an SEM image. As shown in FIG. 5, a an area of 1 mm×1 mm of the SEM image was equally divided into nine, and the average pore size of each of the 9 equal regions (region of ⅓ mm×⅓ mm) was obtained. The region having an average pore size of 15 μm or more was defined as a large pore region, and the region having an average pore size of 8 μm or less was defined as a small pore region. The number and the total area of the large pore regions and those of the small pore regions among the 9 equal regions obtained by dividing the vision of 1 mm×1 mm were obtained.

The aforementioned treatment was performed for 10 visions, and the number per 10 mm² was obtained by sum up the numbers for 10 visions. As shown in FIG. 4, the aforementioned treatment was performed for 5 or more grinded faces, and the grinded face having the smallest total area of the large pore regions is shown in Table 2 to give a representative value.

Specifically, for example, regarding the honeycomb structure 10 of Example 1, the total area and the number of the large pore regions per 10 mm² were obtained in 5 or more grinded faces, and the grinded face having the smallest total area of the large pore regions is shown in Table 2. Example 2 employed a honeycomb structure 10 different from Example 1. Also for Example 2, the total area and the number of the large pore regions per 10 mm² were obtained in 5 or more grinded faces, and the grinded face having the smallest total area of the large pore regions is shown in Table 2. Regarding the other Examples including Example 3, the same means was taken.

The average pore size of the large pore regions shown in Table 2 was obtained by averaging out the average pore sizes of the regions classified as a large pore region among the regions of ⅓ mm×⅓ mm. In addition, in the same manner, the average pore size of the small pore regions was obtained by averaging out the average pore size of the regions classified as a small pore region among the regions of ⅓ mm×⅓ mm.

[Catalyst Load Amount (g/L)]

A catalyst is coated on the honeycomb structure 10, and the catalyst load amount (g/L) per liter of the volume of the honeycomb structure 10 was calculated. Incidentally, as the catalyst, a SCR catalyst containing Cu-substituted zeolite as the main component was used.

[Pressure Loss]

The "pressure loss" of the exhaust gas purification filter 100 where a catalyst was coated was measured according to the following method. Air was sent into the sample (honeycomb catalyst body) at a flow rate of 0.5 m³/min. at room temperature, and differential pressure in front and at the back of the sample (difference between the pressure on the air inflow side and the pressure on the air outflow side) was measured to calculate the pressure loss. When the pressure loss was below 7 kPa, the evaluation of "good" was given, while, when the pressure loss was 7 kPa or more, the evaluation of "bad" was given.

TABLE 2

| | Large pore region | | | Small pore region | | | Catalyst coat amount | Pressure loss after catalyst-coating | |
|---|---|---|---|---|---|---|---|---|---|
| | Total area (mm²) | Number | Average pore size | Total area (mm²) | Number | Average pore size | | | |
| | (per 10 mm²) | (per 10 mm²) | (μm) | (per 10 mm²) | (per 10 mm²) | (μm) | (g/L) | (kPa) | Evaluation |
| Example 1 | 0.1 | 1 | 20 | 0.3 | 3 | 5 | 220 | 5.5 | Good |
| Example 2 | 0.3 | 3 | 25 | 0.1 | 1 | 5 | 220 | 5.4 | Good |

TABLE 2-continued

|  | Large pore region | | | Small pore region | | | Catalyst coat amount | Pressure loss after catalyst-coating | |
|---|---|---|---|---|---|---|---|---|---|
|  | Total area (mm²) (per 10 mm²) | Number (per 10 mm²) | Average pore size (μm) | Total area (mm²) (per 10 mm²) | Number (per 10 mm²) | Average pore size (μm) | (g/L) | (kPa) | Evaluation |
| Example 3 | 0.5 | 5 | 55 | 0.2 | 2 | 5 | 220 | 5.3 | Good |
| Example 4 | 0.5 | 5 | 150 | 0.3 | 3 | 8 | 220 | 4.9 | Good |
| Example 5 | 0.5 | 5 | 200 | 0.5 | 5 | 8 | 220 | 4.5 | Good |
| Example 6 | 0.5 | 5 | 55 | 0.5 | 5 | 0.1 | 220 | 5.6 | Good |
| Example 7 | 0.5 | 5 | 55 | 0.8 | 8 | 2 | 220 | 5.3 | Good |
| Example 8 | 1 | 10 | 55 | 0.5 | 5 | 5 | 220 | 5.3 | Good |
| Example 9 | 1 | 10 | 55 | 1 | 10 | 7 | 220 | 5.3 | Good |
| Example 10 | 2 | 20 | 55 | 1 | 10 | 8 | 220 | 5.2 | Good |
| Comp. Ex. 1 | 0 | 0 | — | 0.2 | 2 | 8 | 220 | 10.5 | Bad |
| Comp. Ex. 2 | 0.5 | 5 | 150 | 0 | 0 | — | 220 | 12 | Bad |
| Comp. Ex. 3 | 0 | 0 | — | 0.2 | 2 | 8 | 220 | 7.8 | Bad | large pore region: region having an average pore size of 20 μm or more
small pore region: region having an average pore size of 8 μm or less Comparative Examples 1 and 3 had no large pore region, and the pressure loss after coating the catalyst was large. Comparative Example 2 had no small pore region, and the pressure loss after coating the catalyst was large.

An exhaust gas purification filter of the present invention can be used as a filter for trapping particulate matter contained in exhaust gas discharged from internal combustion engines and various combustion apparatuses. In particular, it can suitably be used as a filter for purifying exhaust gas having small discharge amount of particulate matter.

What is claimed is:

1. A wall flow type exhaust gas purification filter comprising:
    a honeycomb structure having porous ceramic partition walls separating and forming a plurality of cells extending from one end portion to the other end portion and functioning as exhaust gas passages, and
    plugging portions disposed in one side opening end portions of predetermined cells and the other side opening end portions of the other cells,
    wherein, when an average pore size is obtained for each region of ⅓ mm×⅓ mm in a range of 10 mm² in an arbitrary cross section parallel to a surface of the partition walls, a large pore region having an average pore size of 15 μm or more has an area of 0.1 mm² or more, and a small pore region having an average pore size of 8 μm or less has an area of 0.1 mm² or more,
    wherein the average pore size is measured before the catalyst is loaded on the partition walls.

2. The wall flow type exhaust gas purification filter according to claim 1, wherein the large pore region has an average pore size of 20 μm or more and 200 μm or less and wherein the small pore region has an average pore size of 0.1 μm or more and 8 μm or less.

3. The wall flow type exhaust gas purification filter according to claim 2, wherein the partition walls have a porosity of 50% or more and 70% or less.

4. The wall flow type exhaust gas purification filter according to claim 3, wherein the partition walls have a thickness of 50.8 μm or more and 406.4 μm or less.

5. The wall flow type exhaust gas purification filter according to claim 4, wherein the honeycomb structure has a cell density of 100 cpsi or more and 700 cpsi or less.

6. The wall flow type exhaust gas purification filter according to claim 5, wherein the honeycomb structure contains one of cordierite, aluminum titanate, SiC, Si-bonded SiC, and mullite.

7. The wall flow type exhaust gas purification filter according to claim 6, wherein a SCR catalyst is coated on internal portions and surfaces of the partition walls.

8. The wall flow type exhaust gas purification filter according to claim 6, wherein at least two kinds selected from noble metals of Pt, Rh, and Pd and a ternary catalyst containing at least one kind selected from alumina, ceria, and zirconia are coated on internal portions and surfaces of the partition walls.

9. The wall flow type exhaust gas purification filter according to claim 1, wherein the partition walls have a porosity of 50% or more and 70% or less.

10. The wall flow type exhaust gas purification filter according to claim 1, wherein the partition walls have a thickness of 50.8 μm or more and 406.4 μm or less.

11. The wall flow type exhaust gas purification filter according to claim 1, wherein the honeycomb structure has a cell density of 100 cpsi or more and 700 cpsi or less.

12. The wall flow type exhaust gas purification filter according to claim 1, wherein the honeycomb structure contains one of cordierite, aluminum titanate, SiC, Si-bonded SiC, and mullite.

13. The wall flow type exhaust gas purification filter according to claim 1, wherein a SCR catalyst is coated on internal portions and surfaces of the partition walls.

14. The wall flow type exhaust gas purification filter according to claim 1, wherein at least two kinds selected from noble metals of Pt, Rh, and Pd and a ternary catalyst containing at least one kind selected from alumina, ceria, and zirconia are coated on internal portions and surfaces of the partition walls.

* * * * *